US008572477B1

(12) United States Patent
Moskovitz et al.

(10) Patent No.: US 8,572,477 B1
(45) Date of Patent: Oct. 29, 2013

(54) WEB-BASED INCREMENTAL COMPUTING

(75) Inventors: Dustin Moskovitz, San Francisco, CA (US); Justin Rosenstein, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 13/017,730

(22) Filed: Jan. 31, 2011

Related U.S. Application Data

(60) Provisional application No. 61/299,916, filed on Jan. 29, 2010.

(51) Int. Cl.
*G06F 17/00* (2006.01)

(52) U.S. Cl.
USPC .......................................... 715/234; 715/200

(58) Field of Classification Search
USPC .................................. 715/200, 234
See application file for complete search history.

(56) References Cited

U.S. PATENT DOCUMENTS

| | | | | |
|---|---|---|---|---|
| 6,745,208 B2* | 6/2004 | Berg et al. | ............................. | 1/1 |
| 6,826,726 B2* | 11/2004 | Hsing et al. | ................... | 715/234 |
| 6,836,778 B2* | 12/2004 | Manikutty et al. | .................... | 1/1 |
| 7,181,684 B2* | 2/2007 | Chittu et al. | ................... | 715/255 |
| 7,340,673 B2* | 3/2008 | Malone | ......................... | 715/255 |
| 7,712,025 B2* | 5/2010 | Roessler | ....................... | 715/234 |
| 7,805,523 B2* | 9/2010 | Mitchell et al. | ................ | 709/228 |
| 7,962,547 B2* | 6/2011 | Kern et al. | ..................... | 709/203 |
| 7,984,137 B2* | 7/2011 | O'Toole et al. | ................ | 709/224 |
| 8,239,756 B2* | 8/2012 | Maes et al. | ..................... | 715/234 |
| 2005/0165866 A1* | 7/2005 | Bohannon et al. | ............ | 707/203 |
| 2009/0235156 A1* | 9/2009 | Wake et al. | ..................... | 715/234 |
| 2010/0313149 A1* | 12/2010 | Zhang et al. | .................. | 715/760 |
| 2011/0283179 A1* | 11/2011 | De Magalhaes | .............. | 715/234 |

OTHER PUBLICATIONS

Ray Whitmer, Document Object Model XPATH, Feb. 26, 2004, W3C, pp. 1-16 pdf format.*
http://ambassadortothecomputers.blogspot.com/2010/05/how-froc-works.html, (May 7, 2010), 12 pgs.
Meyerovich, Leo, et al., "Flapjax: A Programming Language for Ajax Applications", Department of Computer Science, Brown University, Providence, Rhode Island (CS-09-04), (Apr. 2009), 21 pgs.
"U.S. Appl. No. 13/038,356, Non Final Office Action mailed Jul. 27, 2012", 10 pgs.
"U.S. Appl. No. 13/038,356, Final Office Action mailed Jan. 23, 2013", 10 pgs.
"U.S. Appl. No. 13/038,356, Response filed Nov. 20, 2012 to Non Final Office Action mailed Jul. 27, 2012", 21 pgs.

* cited by examiner

*Primary Examiner* — Manglesh M Patel
(74) *Attorney, Agent, or Firm* — Schwegman Lundberg & Woessner, P.A.

(57) ABSTRACT

A method and a system implementing web-based incremental computing. A webpage updates when a data value relevant to displayed information is altered and updates only those affected elements. A watch system monitors relevant data values and in conjunction with a dependency tree, may execute functions to alter only altered elements of a webpage. A framework to automatically track data dependencies and propagate data changes is disclosed.

21 Claims, 7 Drawing Sheets

STEP 1

WEB-BASED INCREMENTAL COMPUTING

CLAIM OF PRIORITY

This patent application claims the benefit of priority, under 35 U.S.C. §119(e), to U.S. Provisional Patent Application Ser. No. 61/299,916, entitled "WEB-BASED INCREMENTAL COMPUTING," filed on Jan. 29, 2010, which is hereby incorporated by reference herein in its entirety.

TECHNICAL FIELD

The present application relates generally to the technical field of web technology and, in one specific example, to web-based incremental computing.

BACKGROUND

Multiple factors, such as increasing broadband connectivity, the inconvenience associated with computer viruses and hardware redundancy, and the emergence of advertising supported software as a business model, have bolstered the migration of the functionality of locally stored software applications to network based web applications.

Web applications can require communications over a network with a server, such as a web or database server, which introduces latency issues that affect responsiveness, especially in comparison to locally stored applications. Current web application implementations seek to minimize the effects of latency on application performance by reducing the number of queries and the amount of transmitted data. This can be accomplished by requesting only the altered data and by dynamically updating affected elements of an HTML document, rather than reloading the entire HTML document. The operations defining the data to be queried for and how to update the HTML document are often accomplished through customized software. The creation and maintenance of the customized software can require significant developer resources.

BRIEF DESCRIPTION OF THE DRAWINGS

Some embodiments are illustrated by way of example and not limitation in the figures of the accompanying drawings in which.

DETAILED DESCRIPTION

Figure 1:
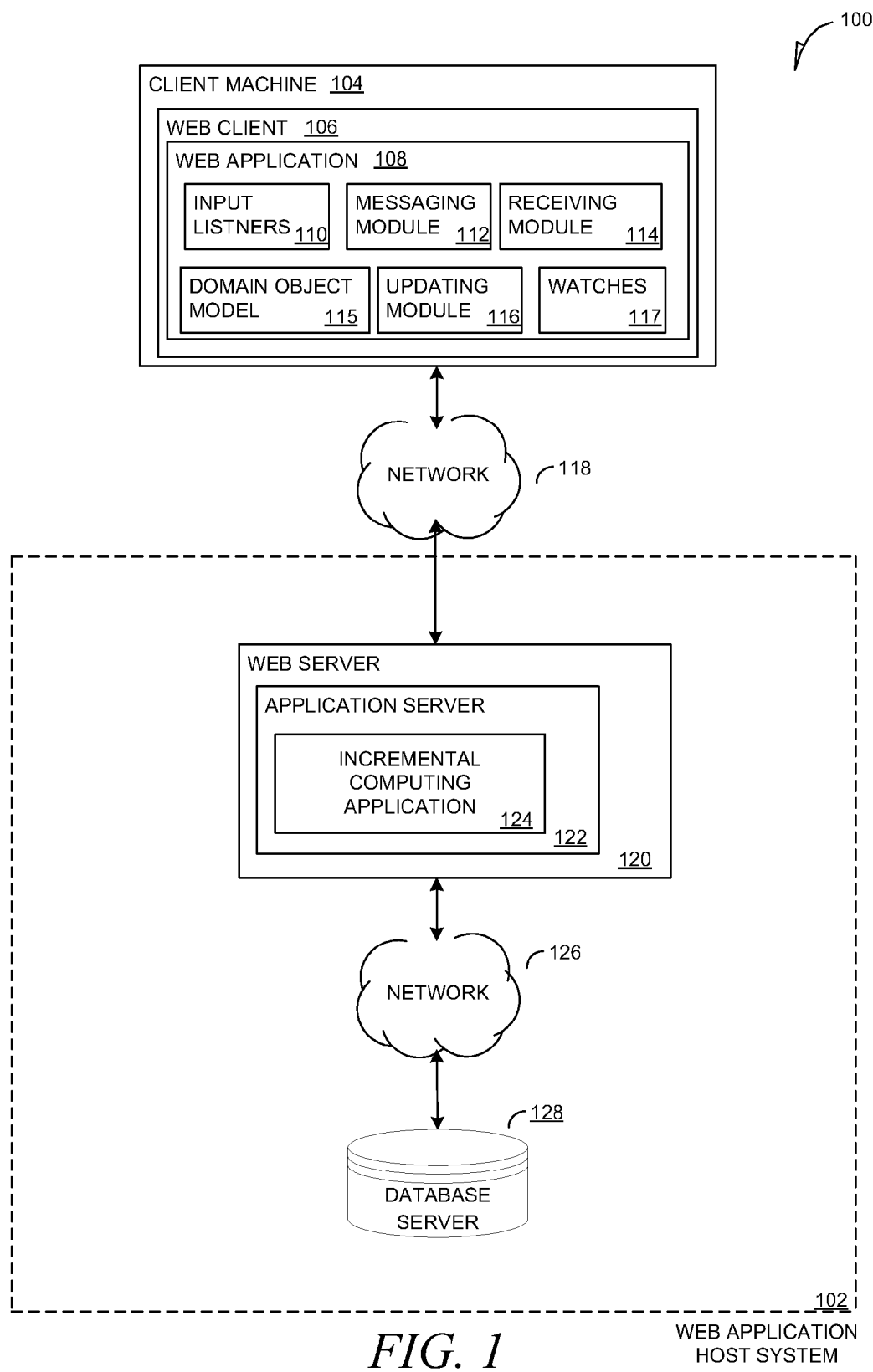
FIG. 1 is a block diagram of a system for implementing web-based incremental computing, according to an example embodiment.

Example methods and systems for supporting web-based incremental computing are described. In the following description, for purposes of explanation, numerous specific details are set forth in order to provide a thorough understanding of example embodiments. It will be evident, however, to one skilled in the art that the present invention may be practiced without these specific details. As used herein, the term "or" may be construed in an inclusive and exclusive sense.

Web applications, such as applications presented via a browser and accessed over a network, provide application users and application developers with certain advantages over locally installed applications. An application developer can design a web application to conform to internet standards to ensure cross-platform compatibility (e.g., Windows, Linux) and a consistent user experience across platforms. Web applications also allow an application developer to update and maintain an application without the need for distributing and installing updates on a user's computer. An application user can access the web application from any device that supports a web client without needing to locally install the application.

The popularity of web applications and the maturation of web application technologies has resulted in a growing focus on areas such as software as a service (SaaS) and cloud computing. The demand for web applications and their related products has also resulted in increasingly complex web applications that require greater amounts of data and computational resources while simultaneously supporting a responsive and rich user experience mirroring the user experience provided by locally installed applications.

Complex web applications can be difficult to write as they depend on data and instructions received over a network from a server. Expensive round trips to a server, such as, but not limited to, a query from a client to a server for data and a response message from the server back to the client, or a similar set of queries between a web server and database server or a data requestor and a data provider, are affected by network latency that may frustrate a responsive user experience. Latency increases with the amount of data requested. In contrast, locally installed applications may access data from a local disk over a hardware bus with a lower latency.

Application developers can reduce the effects of network latency by defining the round trip server queries to fetch relevant data values and by dynamically updating select elements of a webpage based off the fetched data. One method for reducing the amount of data transmitted is to query for data that has been altered, as opposed to reloading an entire webpage. For example, an HTML document presenting a list of data points should be updated when a data point of the list is altered. Rather than requesting from the server the entire HTML document and the entire list of data points, a web application can retrieve only the altered data point and dynamically update the element of the HTML document corresponding to the altered data value, while maintaining the unaffected elements of the HTML document. In an example embodiment, a data value change may affect more than one element of a webpage. However, the customized software defining when and how to update elements of a webpage can be more complex than the operations supporting the main functionality of the web application. In addition, changes to the functionality of the web application may result in changes to the customized software, which may be highly nuanced and difficult to modify. Thus, the production and maintenance of web applications currently may include involvement with customized software, which can often be time consuming and inefficient.

According to an example embodiment, a web technology framework may permit an application developer to design and write a web application and have the customized software controlling updates to webpage elements be automatically generated. In one embodiment, efficient creation and maintenance of web applications is enabled by analyzing source code to generate code that monitors data values which affect what is displayed to a user and that automatically updates webpage elements when a change in data values occurs.

Incremental computing is a paradigm where a data value change causes only those outputs which depend on the changed data value to be recomputed. Alternatively stated, an incremental program is a program that after a certain kind of input change computes new results based on the previously computed result. A related idea is reactive programming, which is a programming paradigm where data values change over time in reaction to certain events. For example, in a traditional imperative environment, the function A=B+C assigns a value to A at a particular time which does not change if the value of B later changes. In a reactive programming environment, A is a dynamic value, or a behavior, whose value updates whenever the value of B or C changes. An example of a reactive program is a spreadsheet program. Some cells of a spreadsheet may be defined with a value, e.g., a number, while other cells are defined in terms of other cells, e.g., formulas. Thus, in a reactive programming spreadsheet application, a cell C1 that is defined as (cell A1+cell B1) will change its value when the value of cell A1 changes, as a function of reactive programming. Moreover, in an application of incremental computing, when the value of cell A1 or B1 changes, the spreadsheet application will re-compute the value of C1 but not other cells unrelated to A1 or B1 that are displayed. In an example embodiment of incremental computing, a data value change may cause only certain elements of a webpage to be altered. In a further embodiment, web applications can be written to support incremental computation, which minimizes the amount of data transmitted from a server and defines when data should be transmitted.

Systems that conform to the principles of incremental computing and reactive programming may build a dependency graph to capture the nature of the data dependences. A dependency graph is a directed graph and may assist in the effective propagation of changes and recalculations when a data value changes. A dependency graph represents the dependencies of objects towards each other. A dependency graph may represent the evaluation path of a function and the data values and evaluated expressions that it depends upon. In an example embodiment, non-root nodes in a dependency graph that have no children represent atomic data values of the system. In an example embodiment, such atomic data values may be a string, integer, or a structured object recognized by the system, such as a list. For sake of brevity, non-root childless nodes in a dependency tree will herein be described as "L values." Other nodes that are defined by and depend on "L values," or nodes with children, for sake of brevity, are herein described as "R values." A node of a dependency graph with no parent represents the output of the function, and is also an R value. The R values of the dependency graph are evaluated side-effect free expressions. A side-effect is the modification of a state, an impact on the outside world or an observable interaction with a calling function. Thus a function which emphasizes change in the state of variables, e.g., x=x+1, has a side-effect. Side-effect free functions and expressions avoid changes in state and have the property that once a variable is defined it is immutable.

Changes propagated to a webpage, such as in an incremental computing and reactive programming paradigm, can be accomplished through a webpage's document object model (DOM). A DOM is a platform and language neutral interface that allows programs and scripts to dynamically access and update the content, structure, and style of an webpage. The DOM provides an interface (API) to get, change, add and delete HTML/XML elements and values. A DOM defines a webpage in a tree structure with various element and node types, which may mirror the elements of the webpage. DOM nodes may be dynamically edited to edit the webpage and the tree of DOM nodes may be traversed through the API.

In an example embodiment, a web application maintains a dependency tree to determine which nodes of the DOM of a webpage to update and how, when an L value changes. In an example embodiment, an application developer can write an application and provide it to a compiler. The compiler may then analyze the source code and output interpreted code, such as, but not limited to, javascript, that runs on a web client or web server that implements an incremental computing system. The incremental computing system may monitor displayed data values and execute functions and access the DOM to incrementally update the webpage when a data value changes.

FIG. 1 is a block diagram of a system 100 for implementing web-based incremental computing, according to an example embodiment. The system for implementing web-based incremental computing contains a web application host system 102. The web application host system 102 hosts data and may compute instructions to support a web application 108. The web application 108 is an application accessed through a web client 106 over a network 118, such as a communications network embodied by the internet or an intranet. The web client 106 may be, but is not limited to, MICROSOFT INTERNET EXPLORER®, SAFARI®, OPERA®, a graphical web browser or a mobile application. The web client 106 is executed from a client machine 104, such as, but not limited to, a personal computer, cell phone, mobile device or machine capable of launching a web client 106.

The web application host system 102 distributes data to the web application 108 through a web server 120. The web server 120 may host or access an application server 122, such as, but not limited to, an APACHE APPLICATION SERVER®. The application server 122 hosts various applications that control and prepare data, including, but not limited to, an incremental computing application 124.

The incremental computing application 124 collects and sends data to the web application 108. In an example embodiment, the incremental computing application 124 may provide push notification to the web application 108 when data values have changed. The incremental computing application 124 accesses a database server 128 through a network 126, such as the internet or an intranet, to collect data which is provided to the web server 120. Content gathered for the web server 120 is communicated to the client machine's 104 web client 106 to support in the execution of the web application 108.

The web application 108 presented by the web client 106 may be updated when data values change. The web application 108 recognizes a data change through an input listener 110 or a receiving module 114. The input listener 110 may capture user input or the occurrence of a trigger event. In an example embodiment, mouse clicks, keyboard input, mouse movement, or other user input, or a trigger event such as the arrival of a certain time, may cause a data value change and be captured by the input listener 110. For example, user input such as a mouse click may check a box which changes a data value, propagating a change to the web application 108. The receiving module 114 may also notify the web application 108 of data value changes. In an example embodiment, the incremental computing application 124 may monitor the relevant data values stored on the database server 128 and push a notification to the web application 108 through the receiving module 114. In an example embodiment, the web application periodically polls the web server 120 and the incremental computing application 124 using the messaging module 112 to check whether data values have changed. The data values may be stored in the database server 128, on the web server 120, with the web application 108, or with the incremental computing application 124. In an example embodiment, the notification of a data value change is enabled by a watch module that monitors data points relevant to the information displayed in the web application 108, the watch modules hereinafter referred to as watches 117. In an example embodiment, watches 117 can evaluate R values to determine if a data change has altered an R value. Watches 117 are implemented based upon the source code implementing the web application 108 and may execute functions of the source code. Watches 117 may poll for or get pushed data relating to data value changes.

When the web application 108 is notified of a data value change by the input listener 110 or the receiving module 114 an updating module 116 is called to propagate changes. In an example embodiment, the data value change notification may include the new value of the data. The propagated changes may include changing what is displayed by the web application and may entail further data queries sent through the messaging module 112 and received by the receiving module 114. In an example embodiment, the updating module 116 receives notification of a data value change and propagates that change to the web application 108 by accessing the DOM 115 of the web application to alter affected elements. In an example embodiment, the watches 117 cause changes to the web application 108 by executing functions, which may be facilitated by the updating module 116, which accesses the DOM 115 of the web application and alters affected elements.

Figure 2:
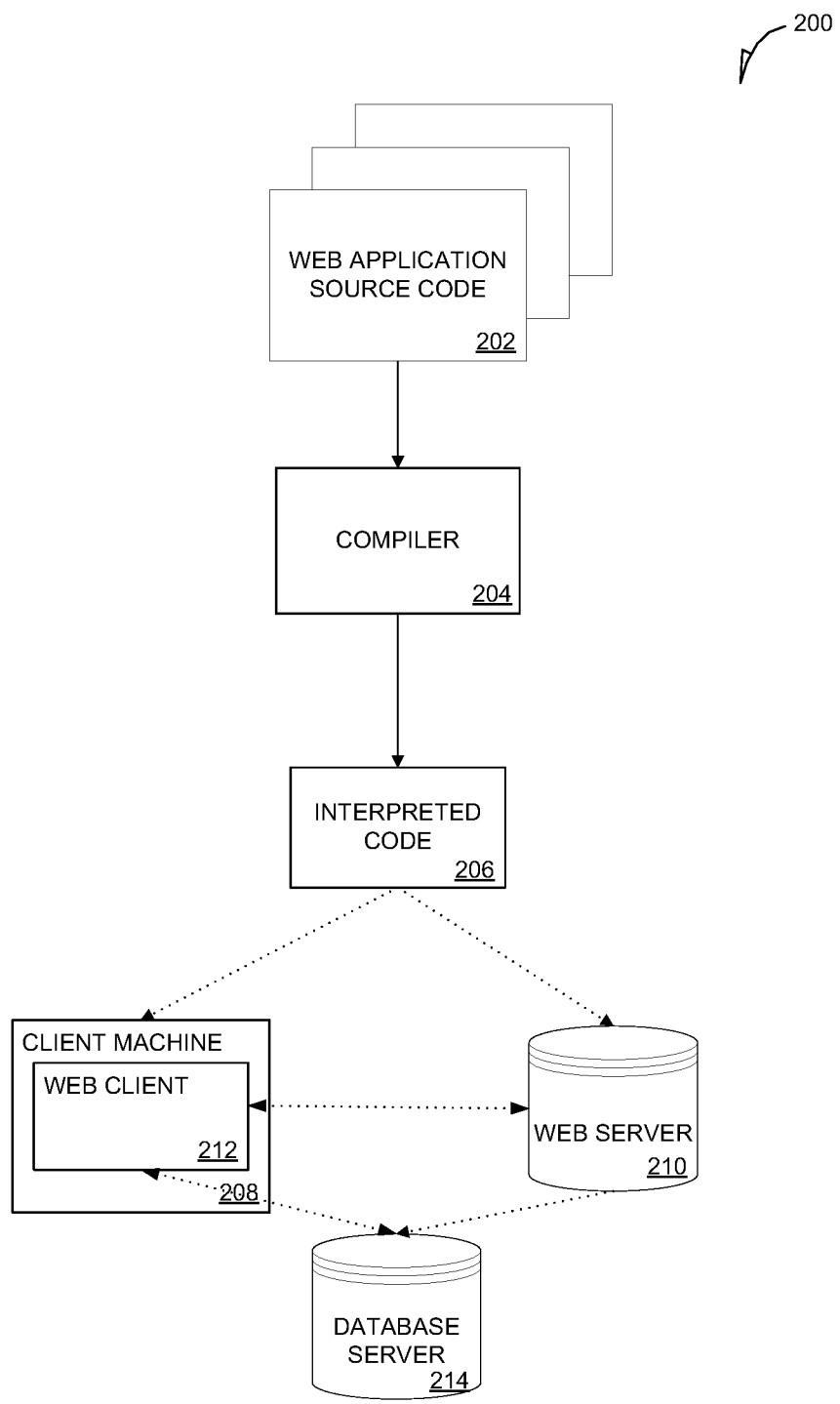
FIG. 2 is a block diagram of a system that analyzes web application source code and implements web-based incremental computing, according to an example embodiment.

FIG. 2 is a block diagram of a system 200 that analyzes web application source code and implements web-based incremental computing, according to an example embodiment. An application developer may write source code 202 defining a web application. In an example embodiment, the web application source code 202 is written in a functional language or a side-effect free imperative language implementation. The source code may be side-effect free only for a limited duration. The application may be written to assume random access to data stored on the web server 210 or a database server 214. The web application source code 202 is provided to a compiler 204 that may translate the source code 202 to interpreted code 206, such as, but not limited to, javascript or other functional or imperative languages that may be run on a web client 212, such as, but not limited to, MICROSOFT INTERNET EXPLORER®, a web server 210 or any machine that may request data from a server. In an example embodiment, the compiler provides javascript code that can be run on the web client 212 of a client machine 208 or a web server 210. The interpreted code 206 implements the process of monitoring data value changes and updating the web application 108 in a fashion compliant with the tenants of incremental computing and reactive programming. In an example embodiment, the interpreted code 206 monitors data values through watches that update the web application through the DOM of the webpage. A web client 212 on a client machine 208 may execute the interpreted code 206 to monitor and request data from a web server 210 or a database server 214. A data request to the web server 210 may result in a query from the web server 210 to the database server 217. The interpreted code 206 may also be executed on a web server 210 to request data from a database server 214 or to push data and instructions to the web application 108.

Figure 3:
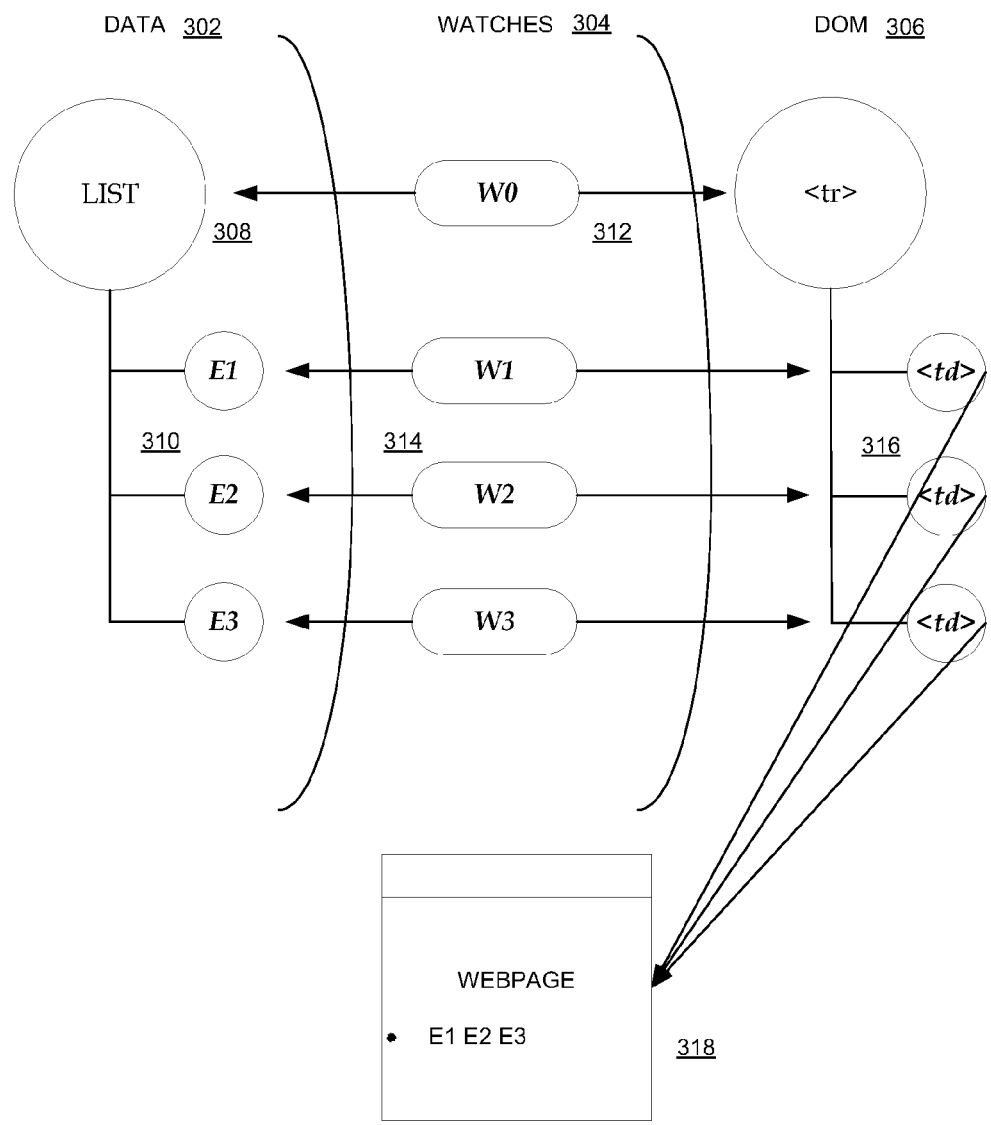
FIG. 3 is a block diagram illustrating the relationship between data, watches, a DOM and a webpage, according to an example embodiment.

FIG. 3 is a block diagram illustrating the relationship between data, watches, a DOM and a webpage, according to an example embodiment. In a web-based incremental computing system, data 302 is monitored by watches 304, which may execute functions that access the DOM 306 to alter a webpage 314. Here, the data 302 is a list 308 that contains three elements, E1, E2 and E3 310. In an example embodiment, the list 308 may be an array and is hosted on the web application or the database server. In this example, the list 308 is directly displayed in a table row with each of its elements as table data on the webpage 314. In the case of structured data, such as a list, watches 307 may form a tree structure to monitor the list 308 and recursively assign watches 314 for each element 310 of the list. In this example, a watch W0 (312) watches the list 308. The elements of the list 310 E1, E2 and E3 are each respectively monitored by watches W1, W2, and W3 (314). Because the elements of the list 310 are directly displayed on the webpage 314 as table data in a table row, the watches 314 may execute functions that directly alter the nodes of the DOM that represent table data 312. In this example, if the value of E1 changes to "3", this will trigger watch W1 to access the DOM nodes 312 to change the table data to "3" which causes the value on the webpage to dynamically update the respective table data element to the value "3." In another example, an element of the list 310 may be moved. In this case, the watches 314 monitoring the respective elements 310 do not sense a data change. However, the watch monitoring the list 312 senses the change and will access the DOM 306 to move the respective element. The watch monitoring the list 312 can also sense when the list is deleted to remove the table row from the webpage 314.

Figure 4:
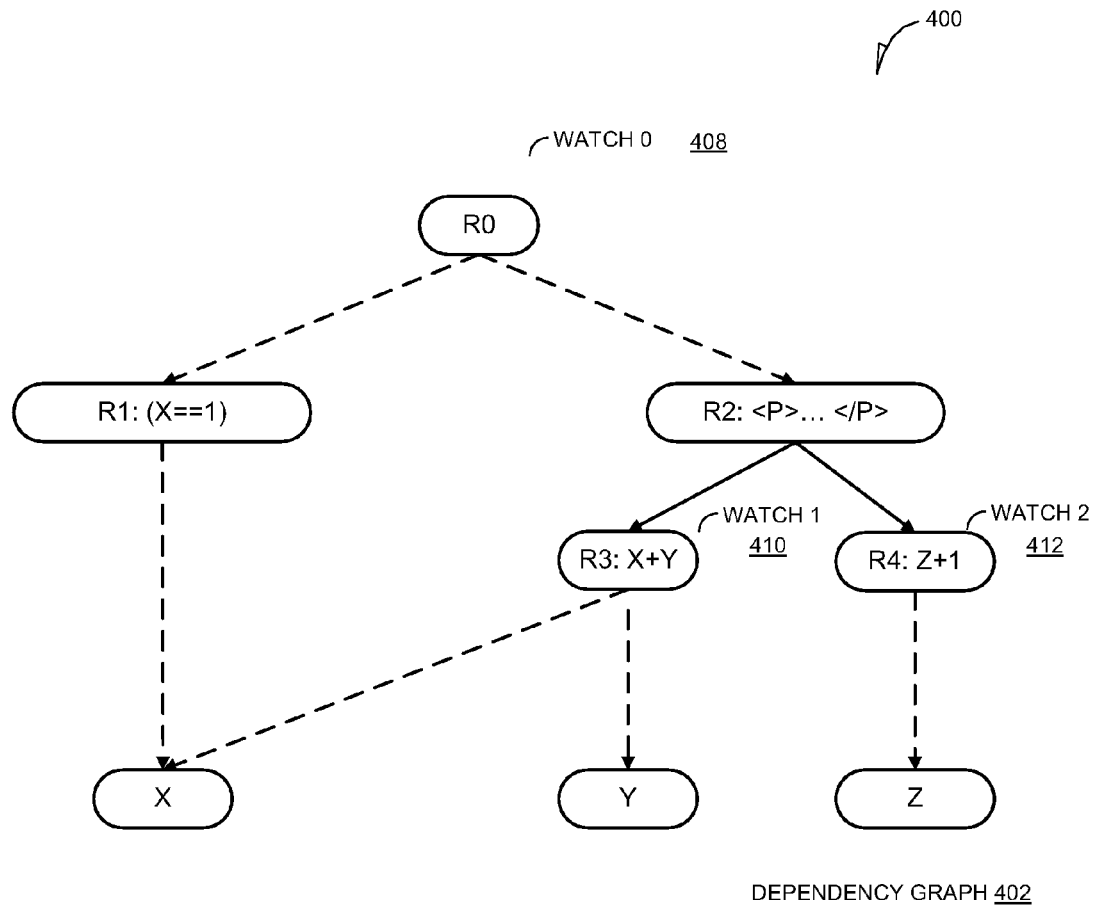
FIG. 4 is a dependency graph, a function and data values illustrating the relationship between R values, L values and watches.

In the example of a non-list data, watches are assigned to R values that are contained within HTML tags, explained in further detail in FIG. 4. A contained relationship correlates an R value to an element or node of the DOM. For example, a value within a <p>...</p> tag in a webpage is represented by an element of the DOM and is also represented by a contained R value of the dependency tree and is monitored by a watch. Thus, changes to the R value are detected by its watch and can be mirrored in the webpage by accessing the associated DOM element without affecting other elements of the webpage.

FIG. 4 is an hierarchical data diagram showing a dependency graph 402, a function 404 and data values 406. The dependency graph 402 shows relationships between R values, L values and watches. As stated prior, L values are atomic values which are non-root nodes in a dependency graph that have no children. L values represent data values that can change. In an example embodiment, L values may be data stored with a database server, a web server or a web application. L values may be strings, integers, Booleans and structured data such as lists. Here, the L values are X, Y and Z. R values are defined as executed side-effect free expressions that rely upon L values or other R values to evaluate. R values are represented in a dependency diagram as the root node and all nodes with children. R values represent evaluated expressions. Here, the R values are R0, R1, R2, R3 and R4, which evaluate to "<p>3, 4</p>", TRUE, "<p>3, 4</p>", 3, and 4, respectively. Dependency graphs are created parallel to the execution of the functions they represent and capture a state of dependencies. In this example, the dependency graph 402 is the current state of dependencies when the function 404 is executed when X=1, Y=2 and Z=3.

For implementing web-based incremental computing, in an example embodiment, two relationship types may exist. A simple dependency, representing that a particular R values depends on another R or L value in order to evaluate its expression is represented by a dotted line. A contains relationship exists when expressions that need to be evaluated are contained within HTML tags that will be returned as output values by the functions called by the watches to render a webpage. Here, the R value of R2 is an HTML tag that contains the expression of R3 and R4 within a paragraph tag. A contains relationship is important in web-based incremental computing because they represent data presented to the user. Contained data also represents data contained within a DOM element. Thus, changes to contained data can be easily updated by editing a DOM node or element. By monitoring R values with a contains relationship, the incremental computing algorithm ensures re-evaluation occurs only on data value changes that will affect the output to the webpage.

Watches are software modules that monitor the value of an R value. Watches may re-run the function, or part of the function, that used the monitored R value for computation, if that R value has changed. Watches may also reevaluate the R value they are associated with in the context of a data value change. In an example embodiment, watches initiate function calls. Watches are assigned to the root R value and all R values that are contained by another R value. Here, watches are assigned to R0, R3 and R4, because R0 is the root node and R3 and R4 are contained by R2. Watches are also assigned a depth value. The depth of a watch is defined as one more than the depth of the first ancestor watch in the dependency graph, with the watch of the root node having a depth of zero. Here, watch 0 (408) has a depth of zero because it monitors the root node. Watch 1 (410) has a depth of 1, because watch 0 (408) is its first ancestor. Watch 2 (412) similarly has a depth of 1 for the same reasons as watch 1 (410). The depths of watch 1 (410) and watch 2 (412) do not impact each other because they are not ancestors. The depth assigned to watches determines the correct order in which to execute a watches associated functions so as to avoid computing irrelevant functions and to avoid potential errors, such as operating on a data value that no longer exists because of the data change. In an example embodiment, when a function is executed a parallel process creates a dependency graph representing the dependencies between data values and evaluated expressions and functions and also assigns watches to the R values subject to a contains relationship.

Figure 5:
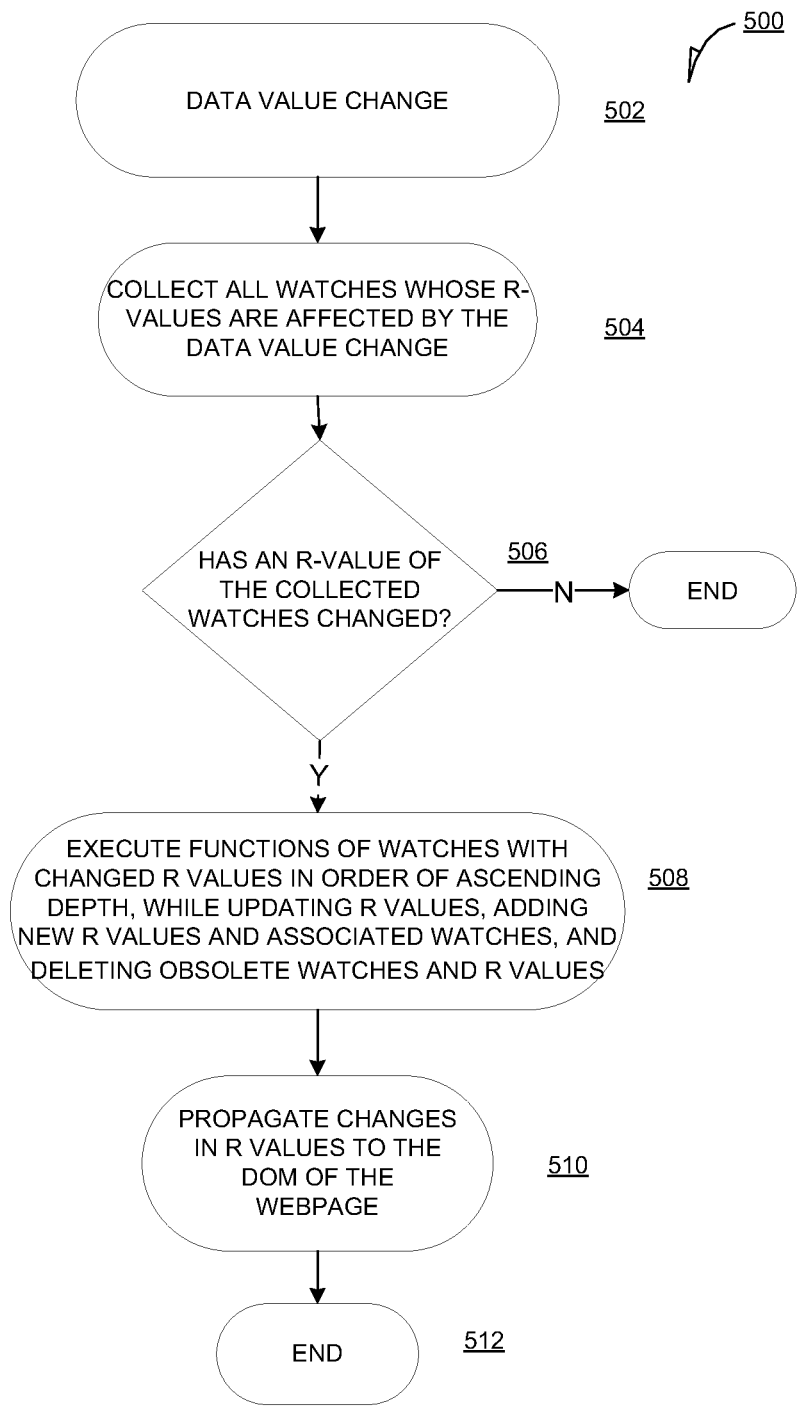
FIG. 5 is a flow chart illustrating a web-based incremental computing process to incorporate a data value change, according to an example embodiment.

FIG. 5 is a flow chart illustrating the web-based incremental computing process 500 to incorporate a data value change, according to an example embodiment. At operation 502, a data value is changed. In an example embodiment, a data value change may be caused by user input, such as, but not limited to mouse clicks or movements or keyboard input. It may also represent that a stored value on a web application, web server or database server has been altered. Data value changes may also be the occurrence of a pre-defined event, such as the arrival of a time or date. A data value change may represent a change in one or more data values. In a dependency graph, data value changes alter the value of an L value. At operation 504, all watches whose R values depended on the altered L value are collected. A watch's R value depends on an L value if in the dependency graph there is a path from the R value to the L value. In an example embodiment, watches executed on a web client, as a part of a web application or on a web server may periodically poll a database server about the values of L values. In an example embodiment, a push notification of changes to L values may be sent to the web application. At operation 506, the R values of the collected watches are re-evaluated provided the data value change. If no R values have changed due to the data value change, then no further action is taken. If an R value of the collected watches has changed due to the data value change, then at operation 508, the watches with modified R values execute their associated functions, in ascending order of watch depth, while updating existing R values, adding new R values and associated watches, and deleting obsolete watches. Because R values exist in a hierarchy, the execution of a function associated with a watch may make obsolete an execution path, and hence the data dependencies, of watches and R values with a greater depth. Thus, R values and watches may become obsolete. New execution paths may also be formed, hence creating new R values and new watches. In an example embodiment, the functions executed by a watch given a data value change may alter the elements of a web page. Thus, a data value change can modify the dependency tree and cause the execution of watch functions, creation of new watches and deletion of obsolete watches. At operation 512, after evaluating a data value change, if a watch exists but with a new R value, such as a prior existing watch with a new value or a newly created watch, then the watch access the DOM of the webpage and alters or creates the DOM element or nodes that the watch's R value is associated with. At operation 512, execution of the incremental computing process 500 is terminated.

Figure 6:
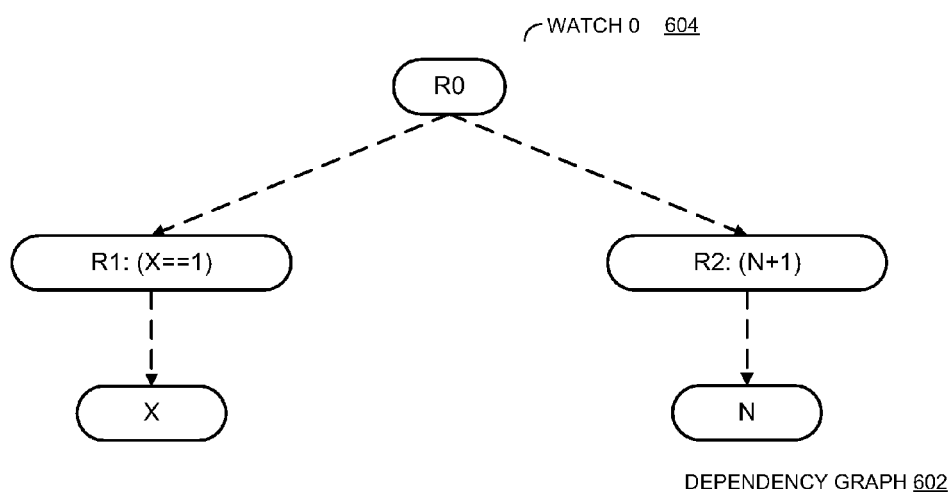
FIG. 6 is a dependency graph, a function and data values illustrating a data value change, according to an example embodiment.

FIG. 6 is a hierarchal data diagram illustrating a dependency graph 602, a function and data values illustrating a data value change. The dependency graph 602 is the result of applying the process of FIG. 5 to the dependency graph of FIG. 4. The process of FIG. 5 is initiated by a data value change, namely X now has the value of 0. According to the dependency graph 402, the L value X was used by, and potentially alters the R values of R0, R1, R2 and R3 because each of these R values has a direct path to the L value X. Of these R values, only R0 and R3 have associated watches, namely Watch 0 and Watch 1. Both these watches' associated R values are changed due to the data value change. R0 evaluates to (n+1) rather than <p> . . . </p>, and R3 evaluates to 2 instead of 3. Thus, the functions of watch 0 and watch 1 are executed, with watch 0 having a lower depth executing first. Thus, the IF statement of 404 and 604 is executed. Since X=0, the function returns (n+1), which is a new expression and new R value. However, since this R value is not contained within any HTML tags, it is a depends on relationship with R0. Moreover, because the expression <p>(x+y), (z+1)</p> is no longer evaluated, the associated R values R2, R3 and R4 and watches watch 1 and watch 2 of dependency graph 402 are obsolete and destroyed. Thus, after watch 0 (604) completes execution of its function, watch 1 is not executed because it has been destroyed. Watch 0 (604) may then access the DOM of the webpage and update the DOM node or element it is associated with to contain the value of 2, the newly evaluated value of (n+1). The dependency graph 602 represents the resulting dependency graph after executing the function as triggered by the data value of X changing from 1 to 0.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
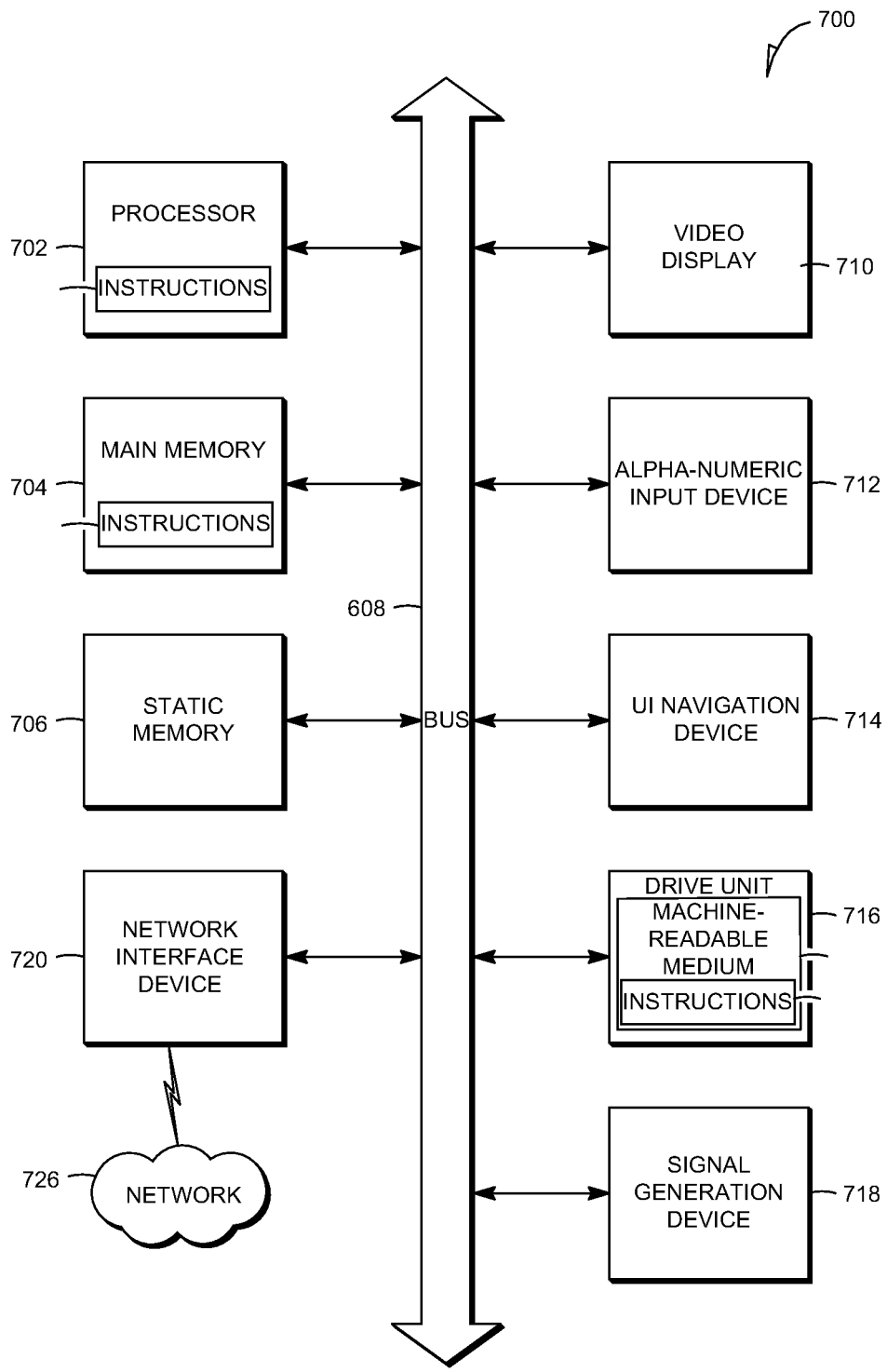
FIG. 7 is a block diagram of machine in the example form of a computer system within which a set instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The following Appendix is expressly incorporated herein by this reference.

APPENDIX

Example Goals
A system which evaluates a program to produce a top-level value describing what should be displayed.
As the input values change the system recomputes only those portions of the evaluation graph that need to be reevaluated.
The root value may be structured. In that case each of the child values is displayed and updated in a similar fashion.

Overview
Rvalues and Lvalues
  The minimal unit of computation in our system is called an rvalue ("are" "value").
  A special type of rvalue is an lvalue, which holds raw data rather than being computed from other rvalues.
  Other rvalues have a set of input values with which they can compute their own value.
Rvalues are side-effect-free. All that they do is compute their own value based on some inputs. To display something in a non-reactive system (such as a browser) we need to connect the reactive system with the non-reactive system.

Watches
  A watch is an object that observes an rvalue and runs a function with side-effects when the rvalue changes.
  Watches form a tree: the root watch watches the root rvalue. It has a function that examines the value of that rvalue and watches any child rvalues in the root rvalue. This continues recursively.
  Besides the root watch, a watch should only run if it is still in the tree. For example, we may be watching a child rvalue of the root rvalue. If the child rvalue changes but is also removed from the root rvalue then we should not rerun the watch.
  When a watch function runs it is expected to rewatch any child rvalues that it watched before. All watches from prior runs will be removed.

Propagation
  The system starts by building a tree of watches to display the current output of the program.
  When one or more lvalues in the system change the new values are propagated through the tree of rvalues.
  The details of this are described below.

Version 1
Rvalues have
  a cached value (or missing if there is no cached value at the moment).
  d A set of rvalues on which they depend (providers) and another set of rvalues which depend on them (consumers).
Watches
  Each watch has a depth indicating its position in the tree of watches.
Initially
  Watch the root rvalue.
  This causes it to be computed.
  The watch runs a function that displays the rvalue's value. If the function is rerun with a new value then it will update the display.
  If the value is a structure then the function will create child watches to watch each of the rvalues in the structure.

When lvalues change
  Find all of the rvalues that depend on the changed lvalues (even transitively) and invalidate them by:
    clearing their cached value
    clearing their lists of providers
  Find all of the watches that are watching any of these rvalues.
  Sort the watches by depth (smallest to largest).
  For each watch:
    Compute the current value of the watch's rvalue.
    If the value has changed then remove any child watches from before and run the watch's function.

Pros and cons
  Fairly simple system. Low overhead.
  However, if an lvalue changes we must recompute everything that depends on it. If one of those rvalues has the same value after the change as it had before we still have to compute everything that depends on the rvalue because we have invalided the caches. (Actually, we can try to avoid that but we still do O(n) work to consider all of these rvalues when invalidating them and later determining that we can keep their old values.)
  Watches fire function, initially
Lists are special values recognized by a system and can be atomic values. This is because lists only have limited actions applied to them, such as moving, deleting and inserting. Lists can be L values and the system can propagate changes to lists to the DOM. Each element of a list does not have to be a separate L value.

What is claimed is:
1. A method to update a document object model (DOM) stored in a computer readable storage device, wherein producing the DOM includes running a function that includes multiple expressions on a computer system in response to a set of input values, the method comprising:
  producing a dependency graph structure in a computer readable storage device that includes nodes that correspond to reactive values produced in the course of evaluation of the expressions within the function in response to the set of input values and that includes a node that corresponds to a contained in relationship between a reactive value and a corresponding element of the DOM in response to evaluation of one or more expressions within the function in response to the set of input values indicating inclusion of such node having the contained in relationship and that includes paths among the nodes that represent dependency relationships among the reactive values, wherein respective paths include a root node and include respective input nodes that are associated with respective input values and include respective nodes, disposed between the root node and respective input nodes, that are associated in the storage device with at least one of expressions within the function used to produce respective reactive values that correspond to those respective nodes or to the contained in relationship;
  detecting a change of at least one input value from the set of input values;
  in response to the detected change of the at least one input value, selecting in ascending order of node depth within the dependency graph structure, a respective node from among the root node and respective nodes on respective paths that have a respective input node associated with a respective changed input value; and re-running on a computer system a respective expression, that is associated with the respective selected node, using the changed input value to determine a respective changed reactive value;

in response to the re-running the respective expression associated with the respective selected node, prior to re-running an expression associated with a respective next selected node in the ascending order of node depth, changing the dependency graph structure to represent any changes to one or more dependency relationships among reactive values produced as a result of the respective re-running;

continuing the acts of re-running and changing in the ascending order of node depth within the changed dependency graph structure; and in the course of the acts of re-running, in response to the dependency graph structure including a node that corresponds to a contained in relationship between a changed reactive value and a corresponding element of the DOM, propagating the changed reactive value to that corresponding element of the DOM.

2. The method of claim 1,
wherein changing the dependency graph structure to represent any changes to one or more dependency relationships among reactive values produced as a result of the respective re-running includes:
adding a node to the dependency graph structure.

3. The method of claim 1,
wherein changing the dependency graph structure to represent any changes to one or more dependency relationships among reactive values produced as a result of the respective re-running includes:
deleting a node from the dependency graph structure.

4. The method of claim 1,
wherein changing the dependency graph structure to represent any changes to one or more dependency relationships among reactive values produced as a result of the respective re-running includes:
adding a node to the dependency graph structure; and
deleting a node from the dependency graph structure.

5. The method of claim 1,
wherein respective nodes of dependency graph structure are associated in the storage device with respective reactive values produced using respective expressions associated with the nodes.

6. The method of claim 5 further including:
wherein the act of re-running the respective expression associated with the respective selected node, prior to re-running an expression associated with a respective next selected node in the ascending order of node depth, further includes changing the dependency graph structure to,
associate the respective changed reactive value in the storage device with the respective selected node.

7. The method of claim 1,
wherein continuing the acts of re-running and changing in the ascending order of node depth within the changed dependency graph structure includes terminating the acts of re-running and changing in response to a changed dependency graph structure in which no path that includes a node that is associated with a changed input value includes a node that corresponds to a reactive value that has respective contained-in relationship with another reactive value that corresponds to another respective node of the dependency graph structure.

8. The method of claim 1,
wherein respective nodes of dependency graph structure are associated in the storage device with respective reactive values produced using respective expressions associated with the nodes; and further including:
associating respective watch programs with the root node and with respective nodes that correspond to respective reactive values that have respective contained-in relationships with other reactive values that correspond to other respective nodes of the dependency graph structure;
using a watch program associated with a node to run an expression associated with the node to determine whether a reactive value associated with the node has changed.

9. The method of claim 1 further including:
associating respective watch programs with the root node and with respective nodes that correspond to respective reactive values that have respective contained-in relationships with other reactive values that correspond to other respective nodes of the dependency graph structure;
wherein re-running on a computer system a respective expression, that is associated with the respective selected node, involves using a respective watch process associated with the respective selected node to run the respective expression using the changed input value, to determine a respective changed reactive value.

10. The method of claim 1 further including:
associating respective watch programs with the root node and with respective nodes that correspond to respective reactive values that have respective contained-in relationships with other reactive values that correspond to other respective nodes of the dependency graph structure; and
wherein re-running on a computer system a respective expression, that is associated with the respective selected node, involves using a respective watch process associated with the respective selected node to run the respective expression using the changed input value, to determine a respective changed reactive value; and
wherein the act of re-running the respective expression associated with the respective selected node, prior to re-running an expression associated with a respective next selected node in the ascending order of node depth, further includes changing the dependency graph structure to,
remove an association in the storage device between the changed dependency graph structure and a respective watch program that has become obsolete.

11. The method of claim 1 further including:
associating respective watch programs with the root node and with respective nodes that correspond to respective reactive values that have respective contained-in relationships with other reactive values that correspond to other respective nodes of the dependency graph structure; and
wherein re-running on a computer system a respective expression, that is associated with the respective selected node, involves using a respective watch process associated with the respective selected node to run the respective expression using the changed input value, to determine a respective changed reactive value; and
wherein the act of re-running the respective expression associated with the respective selected node, prior to re-running an expression associated with a respective next selected node in the ascending order of node depth, further includes changing the dependency graph structure to,
add an association in the storage device between a respective watch program and a respective node of the changed dependency graph structure that corresponds to a reactive value that has a contained-in relationship with another reactive value that corresponds to another node of the graph.

12. The method of claim 1,
wherein detecting a change of at least one input value includes capturing user input.

13. The method of claim 1,
wherein detecting a change of at least one input value includes receiving notification of a changed database value.

14. An article of manufacture that includes a computer readable storage device that stores computer readable code to configure a computer to implement a method to update a document object model (DOM) stored in a computer readable storage device, wherein producing the DOM includes running a function that includes multiple expressions on a computer system in response to a set of input values, the method comprising:
producing a dependency graph structure in a computer readable storage device that includes nodes that correspond to reactive values produced in the course of evaluation of the expressions within the function in response to the set of input values and that includes a node that corresponds to a contained in relationship between a reactive value and a corresponding element of the DOM in response to evaluation of one or more expressions within the function in response to the set of input values indicating inclusion of such node having the contained in relationship and that includes paths among the nodes that represent dependency relationships among the reactive values, wherein respective paths include a root node and include respective input nodes that are associated with respective input values and include respective nodes, disposed between the root node and respective input nodes, that are associated in the storage device with at least one of expressions within the function used to produce respective reactive values that correspond to those respective nodes or to the contained in relationship;
detecting a change of at least one input value from the set of input values;
in response to the detected change of the at least one input value, selecting in ascending order of node depth within the dependency graph structure, a respective node from among the root node and respective nodes on respective paths that have a respective input node associated with a respective changed input value; and
re-running on a computer system a respective expression, that is associated with the respective selected node, using the changed input value to determine a respective changed reactive value;
in response to the re-running the respective expression associated with the respective selected node, prior to re-running an expression associated with a respective next selected node in the ascending order of node depth, changing the dependency graph structure to represent any changes to one or more dependency relationships among reactive values produced as a result of the respective re-running;
continuing the acts of re-running and changing in the ascending order of node depth within the changed dependency graph structure; and
in the course of the acts of re-running, in response to the dependency graph structure including a node that corresponds to a contained in relationship between a changed reactive value and a corresponding element of the DOM, propagating the changed reactive value to that corresponding element of the DOM.

15. The article of claim 14,
wherein changing the dependency graph structure to represent any changes to one or more dependency relationships among reactive values produced as a result of the respective re-running includes:
adding a node to the dependency graph structure.

16. The article of claim 14,
wherein changing the dependency graph structure to represent any changes to one or more dependency relationships among reactive values produced as a result of the respective re-running includes:
deleting a node from the dependency graph structure.

17. The article of claim 14,
wherein changing the dependency graph structure to represent any changes to one or more dependency relationships among reactive values produced as a result of the respective re-running includes:
adding a node to the dependency graph structure; and
deleting a node from the dependency graph structure.

18. The article of claim 14,
wherein continuing the acts of re-running and changing in the ascending order of node depth within the changed dependency graph structure includes terminating the acts of re-running and changing in response to a changed dependency graph structure in which no path that includes a node that is associated with a changed input value includes a node that corresponds to a reactive value that has respective contained-in relationship with another reactive value that corresponds to another respective node of the dependency graph structure.

19. The article of claim 14,
wherein respective nodes of dependency graph structure are associated in the storage device with respective reactive values produced using respective expressions associated with the nodes; and further including:
associating respective watch programs with the root node and with respective that correspond to respective reactive values that have respective contained-in relationships with other reactive values that correspond to other respective nodes of the dependency graph structure;
using a watch program associated with a node to run an expression associated with the node to determine whether a reactive value associated with the node has changed.

20. The article of claim 14, the method further including:
associating respective watch programs with the root node and with respective nodes that correspond to respective reactive values that have respective contained-in relationships with other reactive values that correspond to other respective nodes of the dependency graph structure; and
wherein re-running on a computer system a respective expression, that is associated with the respective selected node, involves using a respective watch process associated with the respective selected node to run the respective expression using the changed input value, to determine a respective changed reactive value.

21. A system comprising:
at least one processor;
non-transitory machine readable storage device; and
a communication bus coupling the processor and the storage device;
wherein the storage device stores computer readable code to configure the at least one processor to implement a method to update a document object model (DOM) stored in a computer readable storage device, wherein producing the DOM includes running a function that includes multiple expressions on the at least one processor in response to a set of input values, the method comprising:
producing a dependency graph structure in a computer readable storage device that includes nodes that correspond to reactive values produced in the course of evaluation of the expressions within the function in response to the set of input values and that includes a node that corresponds to a contained in relationship between a reactive value and a corresponding element of the DOM in response to evaluation of one or more expressions within the function in response to the set of input values indicating inclusion of such node having the contained in relationship and that includes paths among the nodes that represent dependency relationships among the reactive values, wherein respective paths include a root node and include respective input nodes that are associated with respective input values and include respective nodes, disposed between the root node and respective input nodes, that are associated in the storage device with at least one of expressions within the function used to produce respective reactive values that correspond to those respective nodes or to the contained in relationship;
detecting a change of at least one input value from the set of input values;
in response to the detected change of the at least one input value, selecting in ascending order of node depth within the dependency graph structure, a respective node from among the root node and respective nodes on respective paths that have a respective input node associated with a respective changed input value; and
re-running on a computer system a respective expression, that is associated with the respective selected node, using the changed input value to determine a respective changed reactive value;
in response to the re-running the respective expression associated with the respective selected node, prior to re-running an expression associated with a respective next selected node in the ascending order of node depth, changing the dependency graph structure to represent any changes to one or more dependency relationships among reactive values produced as a result of the respective re-running;
continuing the acts of re-running and changing in the ascending order of node depth within the changed dependency graph structure; and
in the course of the acts of re-running, in response to the dependency graph structure including a node that corresponds to a contained in relationship between a changed reactive value and a corresponding element of the DOM, propagating the changed reactive value to that corresponding element of the DOM.

* * * * *

UNITED STATES PATENT AND TRADEMARK OFFICE
CERTIFICATE OF CORRECTION

PATENT NO.         : 8,572,477 B1
APPLICATION NO.    : 13/017730
DATED              : October 29, 2013
INVENTOR(S)        : Moskovitz et al.

Page 1 of 1

It is certified that error appears in the above-identified patent and that said Letters Patent is hereby corrected as shown below:

In the Claims

In column 16, line 10-11, in Claim 8, after "structure;", insert --and--, therefor In column 16, line 21-22, in Claim 9, after "structure;", insert --and--, therefor In column 18, line 50, in Claim 19, after "structure;", insert --and--, therefor Signed and Sealed this
Ninth Day of December, 2014

Michelle K. Lee
*Deputy Director of the United States Patent and Trademark Office*